(12) United States Patent
Augustin et al.

(10) Patent No.: US 7,374,788 B2
(45) Date of Patent: May 20, 2008

(54) ENCAPSULATION OF FOOD INGREDIENTS

(75) Inventors: Mary Ann Augustin, Werribee (AU);
Luz Sanguansri, Werribee (AU)

(73) Assignee: Commonwealth Scientific & Industrial Science Centre, Campbell, ACT (AU)

( * ) Notice: Subject to any disclaimer, the term of this patent is extended or adjusted under 35 U.S.C. 154(b) by 487 days.

(21) Appl. No.: 10/240,663

(22) PCT Filed: Apr. 3, 2001

(86) PCT No.: PCT/AU01/00367

§ 371 (c)(1),
(2), (4) Date: Oct. 3, 2002

(87) PCT Pub. No.: WO01/74175

PCT Pub. Date: Oct. 11, 2001

(65) Prior Publication Data

US 2003/0185960 A1    Oct. 2, 2003

(30) Foreign Application Priority Data

Apr. 4, 2000  (AU) ..................... PQ6663
Jul. 18, 2000  (AU) ..................... PQ8823

(51) Int. Cl.
*A23L 3/00*  (2006.01)
(52) U.S. Cl. .............. 426/531; 426/465; 426/541; 426/601; 426/656; 426/658
(58) Field of Classification Search ............. 426/601, 426/541, 89, 96, 98
See application file for complete search history.

(56) References Cited

U.S. PATENT DOCUMENTS

| 4,346,121 | A | * | 8/1982 | Turos ..................... 426/580 |
| 4,466,986 | A | * | 8/1984 | Guggenbuehler et al. ... 426/533 |
| 4,670,268 | A | * | 6/1987 | Mahmoud .................. 426/72 |
| 4,968,522 | A | * | 11/1990 | Steinke et al. ............. 426/602 |
| 4,968,552 | A | * | 11/1990 | Linde ..................... 428/195.1 |
| 4,985,261 | A | * | 1/1991 | Kang et al. ................ 426/243 |
| 4,999,208 | A | * | 3/1991 | Lengerich et al. .......... 426/549 |
| 5,043,173 | A | * | 8/1991 | Steinke et al. ............. 426/94 |
| 5,059,434 | A | * | 10/1991 | Kang et al. ................ 426/96 |
| 5,064,669 | A | * | 11/1991 | Tan et al. .................. 426/307 |
| 5,091,200 | A | * | 2/1992 | Kang et al. ................ 426/243 |
| 5,143,737 | A | | 9/1992 | Richardson |
| 5,362,504 | A | * | 11/1994 | Kamper et al. ............. 426/89 |
| 5,458,898 | A | * | 10/1995 | Kamper et al. ............. 426/243 |
| 5,607,708 | A | * | 3/1997 | Fraser et al. ............... 426/96 |
| 5,789,001 | A | | 8/1998 | Klopfenstein et al. |
| 6,428,461 | B1 | * | 8/2002 | Marquez et al. ............. 554/5 |
| 6,562,391 | B1 | * | 5/2003 | Vauthey et al. ............. 426/533 |

FOREIGN PATENT DOCUMENTS

WO    WO 80/01869    9/1980
WO    WO 94/00996    1/1994

OTHER PUBLICATIONS

CAPLUS. Chemical Abstracts 1986:570756, Document No. 105:170756.Obretenov et al. 1986. Developments in Food Science. pp. 281-290.*
CAPLUS. Chemical Abstracts 1991:534394, Document No. 115:134394. Dickinson et al. . Food Hydrocolloids 5(3)281-296.*
CAPLUS. Chemical Abstracts 1992:549641, Document No. 117:14961. Dickinson et al. , Colloids and Surfaces 64(3)299.*
Obretenov, T. 1986. Developments in Food Science 13, p. 281-290.*
Dicinson, E. 1991. Food hydrocollids 5(3), pp. 281-296.*
Dickinson, E. 1992. Colloids and Surfaces 64(3-4) pp. 299-310.*
Riisom et al., "Effect of Amino Acids on the Autoxidation of Safflower Oil in Emulsions," *Journal of the American Oil Chemist's Society* (1980), vol. 57, No. 10, pp. 354-359.

* cited by examiner

*Primary Examiner*—Carolyn Paden
(74) *Attorney, Agent, or Firm*—Foley & Lardner LLP

(57) ABSTRACT

Oxygen sensitive oils or oils containing oil soluble oxygen sensitive substances are encapsulated in proteins which have been reacted with carbohydrates that contain reducing sugar groups. An aqueous mixture of a protein preferably casein and a carbohydrate preferably a sugar is heated within the range of 60 to 160° C. so that Maillard reaction products are formed in the aqueous mixture. The oil phase, up to 50% by weight is then emulsified with the aqueous phase to form micro encapsulated oil particles. The formation of MRP may also be done after emulsification prior to drying. The emulsions can be used as food ingredients or dried to form powders.

7 Claims, No Drawings

ENCAPSULATION OF FOOD INGREDIENTS

This invention relates to the preparation of food ingredients including oxygen sensitive oils or oil soluble ingredients.

BACKGROUND TO THE INVENTION

Oxygen sensitive oils or oxygen sensitive oil soluble ingredients are a significant class of food ingredients. Because of their susceptibility to oxidation the ingredients need to be in a form that is protective as well as enhancing their ease of use. Oils that are of commercial significance which fall into this category are generally those containing polyunsaturated fatty acids.

These ingredients need to be prepared in a form suitable as ingredients for general foods, novel foods, functional foods and nutraceuticals and to be storage stable under the usual transport conditions. Usually the ingredients are processed into stable oil-in-water emulsions or stable powders depending on their end use.

Powdered oils are generally formed by encapsulating the oil in protein forming an emulsion and drying the emulsion to form a powdered oil. Japanese patent 5030906 discloses such a product made by mixing diacetyl ester tartrate monoglyceride and edible oil in an aqueous sodium caseinate solution, emulsifying and drying to form a powder.

Japanese patent 5098286 discloses the encapsulation of unsaturated fatty acids, such as gamma-linolenic acids, with hydrolysed proteins such as lactalbumin, lactoglobulin and casein to prevent oxidation of the acids.

Hydrolysed proteins vary in activity according to the degree of hydolysation and this may vary with different oils. Further the stability of the protein film encapsulating the oils is not always satisfactory. The protection against oxidation is primarily due to the hydrolysed protein preventing contact between oxygen and the unsaturated fatty acids rather than an antioxidant effect of the encapsulant.

U.S. Pat. No. 5,601,760 also discloses micro-encapsulation of milk fat and orange oils using whey proteins as the encapsulant. This patent also suggests that the whey proteins can be mixed with carbohydrates.

U.S. Pat. No. 5,143,737 discloses an animal feed supplement composed of an unsaturated oil encapsulated in a whey solution containing lactose which has been dried to form a powder and then browned to form a Maillard reaction product in the encapsulating matrix.

It is an object of this invention to provide an encapsulant that has good encapsulating properties and is also an anti-oxidant to protect oxygen sensitive oils or oil soluble products.

BRIEF DESCRIPTION OF THE INVENTION

To this end the present invention provides an encapsulant for oxygen sensitive oils or oxygen sensitive oil soluble substances which is prepared by reacting an aqueous mixture of a protein with a carbohydrate containing reducing sugar groups.

The reaction that occurs is between free amine groups of amino acids in the protein and reducing sugar groups in the carbohydrate. This type of reaction is generally termed a Maillard reaction, typically occurring in the non-enzymatic browning of foods. This reaction occurs during heat processing of foods. In this invention the Maillard reaction is accelerated by heating within the range of 60 to 160° C. This invention is partly predicated on the realisation that Maillard reaction products [MRP] can exhibit anti-oxidation activity in the presence of polyunsaturated fatty acids. This invention also relies on the discovery that these Maillard reaction products formed with selected film forming proteinaceous materials produce superior encapsulants for oxygen sensitive oils or oil soluble ingredients. Although whey protein and carbohydrate were proposed as encapsulants in Pat. No. 5,601,760 there was no realisation that heating these ingredients together would greatly improve the resistance to oxygen deterioration whilst maintaining good encapsulation properties.

Thus in one embodiment the present invention provides an oil-in-water emulsion of an oxygen sensitive marine oil or other non-marine oxygen sensitive oil or an oxygen sensitive oil-soluble substance encapsulated in a protein which has been heated in the presence of a carbohydrate to form sufficient Maillard reaction product to protect the encapsulated oil from oxidation.

The oil is preferably an edible oil and the emulsion or the powder obtained by drying the emulsion, is used as a food ingredient, as well as in feed supplements.

The encapsulants of this invention are not only effective anti-oxidants but form stable robust films around the oil droplets.

Any protein useful in encapsulating oils can be used as the protein component of this invention. A carbohydrate with a reducing sugar functional group is reacted with the protein. The protein is preferably soluble and needs to be stable in the heating range of the Maillard reaction and includes casein, soy and whey proteins, gelatine, egg albumin and hydrolysed proteins with increased free amino acid groups including soy protein hydrolysate. Care needs to be taken in reacting the protein and carbohydrate to ensure that the conditions do not result in gelling or coagulation of the protein, as this will render the protein incapable of forming a good film. The preferred protein is a milk protein especially casein or whey protein isolate. Casein is the most preferred protein in many applications because of its low cost and its greater resistance to gelling during the heat treatment to form the Maillard reaction products. For infant food applications whey proteins are the preferred protein source.

The preferred carbohydrate is a sugar with a reducing group preferably selected from the group consisting of monosaccharides (eg: glucose, fructose), disaccharides (eg: maltose, lactose), trisaccharides, oligosaccharides and glucose syrups. Any reducing sugar source may be used including honey. The amount of Maillard reaction product in the protein-carbohydrate mixture is critical as an amount sufficient to provide antioxidant activity for the period of the product's shelf life is needed. Preferably the minimum reaction required between the protein and carbohydrate prior to encapsulation consumes at least 10% of the sugar present. The extent of Maillard reaction product formed can be monitored [for a particular protein/carbohydrate combination] by the degree of colour change that occurs. An alternative measure is to assay the unreacted sugar.

In another aspect of this invention there is provided a method of forming an oil-in-water emulsion of an oxygen sensitive oil or an oxygen sensitive oil-soluble substance which includes the steps of:

a) Preparing an aqueous mixture of a protein and a carbohydrate which contains a reducing sugar group
b) Heating the mixture from 60° C. to 160° C. for a period to allow sufficient Maillard reaction products to form without coagulation
c) Dispersing said oil phase into the aqueous phase.

The emulsion may be formed using any conventional homogenisation procedure or by microfluidisation.

Preferably the emulsions have a volume median particle diameter up to 2 microns and the oil phase is about 25% by weight of the emulsion. Higher levels of oil phase, up to 50% by weight, may also be prepared.

To form a powder the emulsion is dried by any conventional drying method to a moisture content no greater than 5%. Such powders will consist of up to about 80% w/w oil.

The protein content in the aqueous mixture is from 5 to 15% by weight with from 1 to 15% by weight of the carbohydrate. After heating, additional carbohydrate or protein or both ingredients may be added to take the protein:carbohydrate weight ratio to between 1:4 and 4:1. The preferred final ratios are between 1:2 and 2:1, depending on the type of protein and carbohydrate used. The quantity of protein and carbohydrate will depend on the amount of oil to be emulsified, the oxygen sensitivity of the oil phase and the anticipated storage period for the product.

The pH of the aqueous phase is between 4 and 10 preferably 6 to 8. The pH range of the aqueous phase will depend on the isoelectric pH of the protein used, which in turn influence protein solubility at various pHs.

The heating period will depend on the temperature to which the aqueous mixture is heated. For heat sensitive proteins lower temperatures and longer heating periods may be appropriate. This invention is partly predicated on the discovery that carrying out the Maillard reaction either before or after emulsification prior to drying provides a more robust emulsion or powder and avoids degradation of the oxygen sensitive oils.

The oils or oil soluble products useful in the present invention are those used in food and pharmaceuticals, which are susceptible to deterioration by oxidation. The oils include those that contain polyunsaturated fatty acids.

The oil phase is added to form an emulsion with up to 50% oil by weight. The emulsification is carried out so that the volume median particle size is less than 5 microns preferably less than 2 microns depending on the final ingredient application.

Throughout this specification the term an oxygen sensitive oil means an oil, fat, or an oil soluble product that is oxygen sensitive which is dissolved or dispersed in an oil phase.

The oils or oil soluble products useful in the present invention are those used in food and pharmaceuticals, which are susceptible to deterioration by oxidation.

The oils include those that contain polyunsaturated fatty acids such as canola oil, borage oil, evening primrose oil, safflower oil, sunflower oil, flaxseed oil, wheat germ oil and grapeseed oil and marine oils obtained from fish such as tuna, herring, mackerel, sardine, cod liver, and shark. Dairy fats or other fats that are oxygen sensitive can also be encapsulated in accordance with this invention. Oil soluble ingredients that need protection from oxidation include vitamin A [retinol], vitamin D [calciferol], vitamin E, tocopherols, tocotrienols, vitamin K [quinone] and beta-carotene [pro-vitamin-A].

The oil-in-water emulsions and powders made in accordance with this invention are suitable as ingredients in making infant formulae, yoghurts, beverages, UHT drinks, pasta products, bread and bakery products, processed cheese etc. They may also be used as an alternative source of oils and fats in ice cream, dairy desserts, creamers, soup bases and filled dairy products. The encapsulants can also be used for nutraceutical applications.

The powders can be additionally coated to improve their performance such as coating with medium chain triglycerides [MCT] for nutritional benefit or with starch to improve the flowability of the powders. Care has to be taken in selecting the protein and carbohydrate to be used as some discolour sufficiently and present a caramelised flavour which may not be suitable for encapsulating some flavour ingredients.

DETAILED DESCRIPTION OF THE INVENTION

A number of formulations were prepared some according to the invention and some for comparative purposes.

Emulsion Formulations

Tuna fish oil was used as an oil of choice in most examples since it contains a high amount of long chain polyunsaturated fatty acids. It is inherently unstable and oxidizes readily when exposed to air. Other oils used in the examples include evening primrose oil (EPO) and anhydrous milk fat (AMF).

A range of formulations were prepared using protein and/or carbohydrate and oil mixtures at different ratios. The formulations were made-up to contain 40-60% fat in the final powder The protein used in these examples was sodium caseinate, whey protein isolate (WPI), soy protein isolate (SPI), skim milk powder (SMP), hydrolysed casein (HCP) and hydrolysed whey protein (HWP). The sugars used, alone or in combination, were glucose, lactose, sucrose, oligosaccharide and dried glucose syrup. A polysaccharide, high-methoxy pectin or carrageenan, was added to protein-sugar mixtures in some formulations.

Emulsion Preparation

Generally the proteins were first dispersed in water at 50-60° C. and allowed to hydrate in the water bath for at least 30 minutes. A portion or the whole amount of the carbohydrate was added into a portion or the whole amount of the protein solution. The pH was adjusted to the desired pH (6.5 to 7.5). For enhancing formation of Maillard reaction products, these protein-carbohydrate mixtures were heated at 90-100° C. or refluxed for 30-90 min and cooled to 50° C. Where the whole amounts of protein or carbohydrates were not used, the remaining amount of protein or carbohydrate was added after the heat treatment. The oil heated to 50-60° C. was added into the protein-carbohydrate solution using a Silverson laboratory high shear mixer. This pre-emulsion mixture was then homogenised at 50-60° C. and 350 bar pressure (single stage) or 350 and 100 bar pressure (in two stages) using a Rannie laboratory high-pressure homogeniser. In some cases, a microfluidizer operated at 800 bar was used. In some cases additional carbohydrates were added after the dispersion of the oil into the heated protein-carbohydrate solution. The formation of MRP may also be done after emulsification prior to drying.

Spray Drying of Emulsions

The emulsions were dried using a Drytec laboratory spray dryer with a twin fluid nozzle at 2.0 bar atomising pressure. The feed was heated to 60° C. prior to atomisation and the inlet and outlet air temperatures were 180° C. and 80° C. respectively.

Powder Free-fat Analysis

The free-fat content of powders was taken as an indication of the efficiency of encapsulation. The estimation of free fat in powder was based on the method by Pisecky (Handbook of Milk Powder Manufacture, 1997, p206) except that petroleum ether was used in place of carbon tetrachloride. Fifty ml of petroleum ether (b.p. 40-60° C.) was added to 10 g powder. The mixture was agitated in a stoppered flask for 15 minutes. The mixture was filtered and the solvent evaporated at 60° C. using a rotary evaporator. The remaining fat residue was then dried in an oven at 105° C. for 1 h.

Oil Droplet Size of Emulsions

The size of the oil droplets in homogenised emulsions was measured using a Mastersizer-X laser diffraction particle size analyser. The emulsion was sampled and added directly to the measuring cell. The volume median diameter D(v,0.5) was taken and used as indicator of the emulsion size.

Quick Powder Stability Test

Ten-ml vials were half filled with tuna oil powder samples and stored at 4 and 35° C. for 3 weeks. Eight panelists were asked to rate the degree of freshness and rancidity of the powder samples stored at 35° C. by sniffing the samples immediately after opening the vials. Each of the samples was evaluated in 4 replicates by different panelists (trained and untrained) and the rancidity scores averaged and compared. The scores were used as a screening technique for evaluation of the degree of deterioration of stored samples.

Propanal Headspace Analysis to Determine Stability of the Microcapsules

Propanal was used as an indication of the oxidative stability of the prepared emulsions and the powdered oil. The powder or the emulsion sample (1 g) was sealed in a glass vial (20 ml), then equilibrated at 40° C. for 30 minutes. A 10 ml of the headspace was analysed using a Perkin Elmer Model HS40 headspace auto-sampler and Perkin Elmer Model Auto-system XL capillary gas chromatograph fitted with a DB1 fused silica capillary column (30 m, 0.32 i.d., 4 micron film) and FID detector. The analysis was repeated on samples spiked with a known quantity of propanal to obtain quantitative values for the analysis. In some cases an internal standard (IS) 3-methylbutanal was used.

EXAMPLE 1

1.1 Powders

Powders containing 40-60% fat containing Na-caseinate and sugar were made using (a) heated Na caseinate-reducing sugar mixtures and (b) unheated Na caseinate -sugar mixtures as encapsulants. Lower rancid odor scores were generally obtained in the system containing heated (refluxed-30 min) Na caseinate-sugar mixtures compared to those that were not refluxed (heated 60° C.-30 min). Selected examples (40% fat, 20% protein, 40% sugars) of powders made with refluxed and heated (60° C.-30 minutes) protein-sugar mixtures showed that refluxing improved the resistance of the powders to the development of rancid odor (Table 1.1). Similarly, trends were obtained with powders with added pectin (60% fat:13.3% protein: 26.6% sugars: 0.12% pectin), with refluxed caseinate-sugar systems being superior encapsulants than those heated at 60° C.-30 minutes (Table 1.1).

TABLE 1.1

Characteristics of 40-60% fat powders prepared from heated casein-sugar solutions showing the effect of heating on powder free fat and stability

| Order of processing | % Casein-% Sugar Concentration at heating | Heat Treatment of Protein-sugar solution | Free Fat (g/100 g powder) | Rancid Odour Score 3 wks-35° C. |
|---|---|---|---|---|
| Powders with 40% tuna oil, 20% Na-caseinate, 2.5% lactose, 37.5% sucrose | | | | |
| Reflux (with lactose)-sugars-oil-homog | 9.8-1.2 | reflux-30 min | 1.8 | 2.0 |
| Powders with 40% tuna oil, 20% Na-caseinate, 20% lactose, 20% sucrose | | | | |
| Heat-(no sugar) sugars-oil-homog | 10-0 | 60° C.-30 min | 2.1 | 3.8 |
| Powders with 40% tuna oil, 20% Na-caseinate, 40% sucrose | | | | |
| Heat-(no sugar) sugars-oil-homog | 10-0 | 60° C.-30 min | 2.8 | 3.8 |
| Powders with 60% tuna oil, 13.3% Na-caseinate, 13.3% lactose, 10.7% sucrose, 2.5% glucose, 0.12% pectin | | | | |
| Reflux (with glucose)-oil-sugars-homog | 8.2-1.5 | reflux-30 min | 7.4 | 1.8 |
| Powders with 60% tuna oil, 13.3% Na-caseinate, 13.3% lactose, 13.2% sucrose, 0.12% pectin | | | | |
| Heat-(no sugar) sugars-oil-homog | 10-0 | 60° C.-30 min | 3.3 | 3.5 |

Oil-sugars-homog "oil was added before all the unheated sugars were added"
Sugars-oil-homog "oil was added after all the unheated sugars were added"
Rancid Odour Score 1 = no rancid odour, 10 = strong rancid odour 1.2 Emulsions Emulsions containing 14-20% fat were made using (a) refluxed Na-caseinate-sugar mixtures and (b) heated (60° C.-30 min) Na caseinate-sugar mixtures as encapsulants, and with or without added pectin. All the emulsions prepared produced fine emulsions of <2 μm (Table 1.2)

2.2 Emulsions

Emulsions containing 21-27% fat were made using (a) heated protein-reducing sugar mixtures and (b) unheated protein-sugar mixtures as encapsulants. The emulsions were prepared at different total solids concentration. The effect of total solids of the emulsion at the time of homogenisation on

TABLE 1.2

Characteristics of emulsions prepared from heated casein-sugar solutions

| Emulsion Formulation | % Casein-% Sugar Concentration at heating | Heat Treatment of Protein-sugar solution | Emulsion Size D (0.5) μm |
|---|---|---|---|
| Na-caseinate-sugar emulsions | | | |
| 14.3% tuna oil, 7.1% Na-caseinate, 0.9% lactose, 13.4% sucrose | 9.8-1.2 | reflux-30 (with lactose) | 0.75 |
| 14.3% tuna oil, 7.1% Na-caseinate, 7.1% lactose, 7.1% sucrose | 10-0 | 60° C.-30 min | 0.72 |
| 14.3% tuna oil, 7.1% Na-caseinate, 14.3% sucrose | 10-0 | 60° C.-30 min | 0.65 |
| Na-caseinate-sugar emulsions with added pectin | | | |
| 21.4% tuna oil, 4.7% Na-caseinate, 4.7% lactose, 3.8% sucrose, 0.9% glucose, 0.04% pectin | 8.2-1.5 | reflux-30 (with glucose) | 1.74 |
| 21.4% tuna oil, 4.7% Na-caseinate, 4.7% lactose, 4.7% sucrose, 0.04% pectin | 10-0 | 60° C.-30 min | 0.59 |

EXAMPLE 2

Effect of Emulsions Total Solids at Homogenisation on Powder Characteristics 2.1 Powders The effect of total solids of the emulsion at the time of homogenisation on the powder free fat was dependent on the type of protein encapsulant used (Table 2.1). With whey protein isolate-sugar systems, higher solids concentration at homogenisation resulted in lower powder free fat but higher rancid odor score. However, with caseinate-sugar system (Table 2.1) higher solids concentration at homogenisation increased both powder free fat and rancid odor score.

the emulsion size was dependent on the type of protein encapsulant and concentration used to (Table 2.2). With whey protein isolate-sugar systems, the emulsion size was the same. However, with caseinate-sugar system (Table 2.2) larger emulsion size were observed as the total solids increased. All the emulsions prepared produced fine emulsions of <2 μm.

TABLE 2.2

Characteristics of emulsions with different total solids concentration (same amount of other components).

| Emulsion Total solids | % Protein-% Sugar Concentration at heating | Heat Treatment of Protein solution | Emulsion Size D (0.5) μm |
|---|---|---|---|
| 21% tuna oil, 5% Na-caseinate, 5% glucose, 5% lactose | | | |
| 36% | 7-0 | 60° C.-30 min | 0.53 |

TABLE 2.1

Characteristics of 60% fat powders made with emulsions having different total solids concentration.

| Emulsion Total solids | % Protein-% Sugar Concentration at heating | Heat Treatment of Protein solution | Free Fat (g/100 g powder) | Rancid Odour Score 3 wks-35° C. |
|---|---|---|---|---|
| Powders with 60% tuna oil, 13.3% Na-caseinate, 13.3% glucose, 13.3% lactose | | | | |
| 36% | 10-0 | 60°-30 min | 3.5 | 2.3 |
| 46% | 10-0 | 60°-30 min | 7.5 | 3.8 |
| Powders with 60% tuna oil, 13.3% WPI, 13.3% lactose, 13.3% sucrose | | | | |
| 36% | 7-0 | 90° C.-30 min | 6.9 | 2.5 |
| 46% | 10-0 | 90° C.-30 min | 4.7 | 3.3 |

Rancid Odour Score 1 = no rancid odour, 10 = strong rancid odour

TABLE 2.2-continued

Characteristics of emulsions with different total solids concentration (same amount of other components).

| Emulsion Total solids | % Protein-% Sugar Concentration at heating | Heat Treatment of Protein solution | Emulsion Size D (0.5) μm |
|---|---|---|---|
| 27% tuna oil, 6.3% Na-caseinate, 6.3% glucose, 6.3% lactose ||||
| 46% | 10-0 | 60° C.-30 min | 0.92 |
| 21% tuna oil, 5% WPI, 5% lactose, 5% sucrose ||||
| 36% | 7-0 | 90° C.-30 min | 0.77 |
| 27% tuna oil, 6.3% WPI, 6.3% lactose, 6.3% sucrose ||||
| 46% | 10-0 | 90° C.-30 min | 0.77 |

Effect of Protein:Carbohydrate Ratio 2.3 Powders

Powders containing 40-60% tuna oil were prepared with different protein to sugar ratios. In powder formulations with the same oil content: the powder free fat was lower when the ratio of protein:carbohydrate was 1:2 compared to when the ratio was 1:1 (table 2.3).

TABLE 2.3

Characteristics of 40-60% fat powders having different protein to sugar ratio.

| Protein:Sugar Ratio | % Protein-% Sugar Concentration at heating | Heat Treatment of Protein solution | Free Fat (g/100 g powder) | Rancid Odour Score 3 wks-35° C. |
|---|---|---|---|---|
| Powders with 40% tuna oil, Na-caseinate-lactose system (36% total solids) |||||
| 1:2 | 10-0 | 60°-30 min | 3.4 | 3.5 |
| 1:1 | 14-0 | 60°-30 min | 9.8 | 8.3 |
| Powders with 60% tuna oil, WPI-lactose-sucrose system (36% total solids) |||||
| 1:2 | 7-0 | 90°-30 min | 6.9 | 2.5 |
| 1:1 | 10-0 | 90°-30 min | 26.4 | 2.25 |

Rancid Odour Score 1 = no rancid odour, 10 = strong rancid odour 2.4 Emulsions

Emulsions containing 40-60% tuna oil were prepared with different protein to sugar ratios. All emulsions prepared had particle size of <2um, emulsion size was smaller in formulations with protein:carbohydrate ratio of 1:2 compared to the ratio of 1:1 (table 2.4).

TABLE 2.4

Characteristics of 14-21% fat emulsions with 36% total solids having different protein to sugar ratio.

| Emulsion Total solids | % Protein-% Sugar Concentration at heating | Heat Treatment of Protein solution | Emulsion Size D (0.5) μm |
|---|---|---|---|
| 14.3% tuna oil, Na-caseinate-lactose system (36% total solids) ||||
| 1:2 | 10-0 | 60°-30 min | 0.67 |
| 1:1 | 14-0 | 60°-30 min | 0.98 |
| 21.4% tuna oil, WPI-lactose-sucrose system (36% total solids) ||||
| 1:2 | 7-0 | 90° C.-30 min | 0.77 |
| 1:1 | 10-0 | 90° C.-30 min | 0.84 |

Effect of Stage of Oil Addition 2.5 Powders

The results showed that the addition of oil before the addition of carbohydrate resulted in lower powder free fat (Table 2.5). This may be expected as the protein is not in competition with the carbohydrate at the time of emulsion formation.

TABLE 2.5

Characteristics of 40-60% fat powders with different stage of oil addition during preparation.

| Stage of Oil Addition | % Protein-% Sugar Concentration at heating | Heat Treatment of Protein solution | Free Fat (g/100 g powder) | Rancid Odour Score 3 wks-35° C. |
|---|---|---|---|---|
| Powders with 40% tuna oil, 20% Na-caseinate, 20% lactose, 20% sucrose, 0.12% carrageenan (36% total solids) |||||
| Ncas:carra:lac:suc:oil[1] | 12-0 | 60°-30 min | 3.7 | 6.3 |
| Ncas:oil:carra:lac:suc[2] | 12-0 | 60°-30 min | 2.4 | 4.5 |
| Powders with 40% tuna oil, 20% Na-caseinate, 20% lactose, 20% sucrose, 0.12% pectin (36% total solids) |||||
| Ncas:HMP:lac:suc:oil[1] | 12-0 | 60°-30 min | 1.9 | 3.0 |
| Ncas:oil:HMP:lac:suc[2] | 12-0 | 60°-30 min | 1.0 | 3.3 |

TABLE 2.5-continued

Characteristics of 40-60% fat powders with different stage of oil addition during preparation.

| Stage of Oil Addition | % Protein-% Sugar Concentration at heating | Heat Treatment of Protein solution | Free Fat (g/100 g powder) | Rancid Odour Score 3 wks-35° C. |
|---|---|---|---|---|
| Powders with 60% tuna oil, 13.3% Na-caseinate, 13.3% lactose, 13.3% sucrose (36% total solids) | | | | |
| Ncas:oil:HMP:lac:suc[2] | 8-0 | 60°-30 min | 3.3 | 3.5 |
| Powders with 60% tuna oil, 13.3% WPI, 13.3% lactose, 13.3% sucrose (36% total solids) | | | | |
| WPI:lac:suc:oil[1] | 7-0 | 90° C.-30 min | 6.9 | 2.5 |
| WPI:oil:lac:suc[2] | 7-0 | 90° C.-30 min | 5.3 | 3.3 |

[1]Oil was added after all the sugars were added
[2]Oil was added before all the sugars were added HMP "high methoxy pectin"; carra "carrageenan"
Rancid Odour Score 1 = no rancid odour, 10 = strong rancid odour 2.6 Emulsions The results showed that the addition of oil before the addition of carbohydrate resulted in lower particle size (Table 2.6). This may be expected as the protein is generally not in competition with the carbohydrate at the time of emulsification and this result in the formation of a more uniform protein layer at the interface, which results in a better emulsion.

TABLE 2.6

Characteristics of emulsions with oil added at different stages during preparation.

| Emulsion Total solids | % Protein-% Sugar Concentration at heating | Heat Treatment of Protein solution | Emulsion Size D (0.5) μm |
|---|---|---|---|
| 14.3% tuna oil, Na-caseinate-lactose-sucrose system with 0.12% carrageenan (36% total solids) | | | |
| Ncas:carra:lac:suc:oil[1] | 12-0 | 60°-30 min | 0.75 |
| Ncas:oil:carra:lac:suc[2] | 12-0 | 60°-30 min | 0.74 |
| 14.3% tuna oil, Na-caseinate-lactose-sucrose system with 0.12% pectin (36% total solids) | | | |
| Ncas:HMP:lac:suc:oil[1] | 12-0 | 60°-30 min | 0.63 |
| Ncas:oil:HMP:lac:suc[2] | 12-0 | 60°-30 min | 0.53 |
| 21.4% tuna oil, Na-caseinate-lactose-sucrose system with 0.12% pectin (36% total solids) | | | |
| Ncas:oil:HMP:lac:suc[2] | 8-0 | 60°-30 min | 0.59 |
| 21.4% tuna oil, WPI-lactose-sucrose system (36% total solids) | | | |
| WPI:lac:suc:oil[1] | 7-0 | 90° C.-30 min | 0.77 |
| WPI:oil:lac:suc[2] | 7-0 | 90° C.-30 min | 0.74 |

[1]Oil was added after all the sugars were added,
[2]Oil was added before all the sugars were added
HMP "high methoxy pectin"; carra "carrageenan"

EXAMPLE 3

To Illustrate the Effect of Different Processing Conditions on 60% Tuna Oil Powder Characteristics with Casein-sugar Maillard Reaction Products (MRPs) as Encapsulant Powders containing 60% tuna oil, were prepared using Maillard Reaction Products produced from the reaction of casein and sugars as encapsulants. A combination of different processing variables were chosen using fractional factorial design to investigate on the effects of these variable on the powder properties and stability during storage. The oils were emulsified into the protein-sugar mixtures that had been heated for at least 90° C. for 30 minutes or by refluxing the mixture for 90 minutes. The emulsions were then homogenised and subsequently dried into powders. The free fat content of the powders was determined after powder production and these ranged from 1-20% which was greatly affected by the combination of processing variables used. Samples of powder (80 g) were stored in 2 litre plastic containers to provide sufficient oxygen in the headspace to accelerate oxidation of the samples. These were stored at 35° C. for 4 weeks. Propanal, was determined using gas chromatography (GC) (static headspace analysis).

The encapsulation efficiency and powder stability can therefore be optimised by choosing the right combination of processing variables and formulation (Table 3).

Effect of pH

The effect of pH (6.5 to 7.5) on propanal headspace concentration was significant ($p<0.001$). This result suggested that pH of the aqueous casein-sugar solution at the time of heating was very important. The results clearly showed this trend where increasing pH from 6.5 to 7.5 reduced the propanal concentration. This pH effect was consistent with the different sugars used, with the change in casein-sugar ratio from 1:1 to 1:2, and also when all or part of the sugar was heated (Table 3)

Effect of Sugar Concentration at Time of Heating to Form MRP

The effect of sugar concentration at time of heating on powder free fat was significant ($p=0.019$). When sugar concentration at time of heating is increased from 2.5% to 12% the resulting powders had lower propanal during storage. This effect is more significant when the protein to sugar ratio is also much lower (Table 3)

Effect of Casein-sugar Ratio

The effect of casein-sugar ratio on propanal was significant (p=0.025). The results showed lower propanal concentration in stored powders, when the amount of sugars are increased in the formulation. This suggests that powders with casein-sugar ratio of 1:2 were more stable against oxidation than powders with casein sugar ratio of 1:1 (Table 3).

Effect of Homogenisation and Heat Treatment

There was some interaction between homogenisation and heat treatment. The interaction of homogenisation and heat treatment was significant (p=0.035). These results suggest that heat treatment at higher temperature and homogenisation of the emulsions in two-stages (350+100 bar) significantly improved powder stability (Table 3).

TABLE 3

Effect of pH, homogenisation, casein-sugar concentration at time of heating, heat treatment temperature, casein:carbohydrate ratio, and type of sugar, on the free fat and stability of high-fat powders using heated casein-sugar systems

| pH at time of heating | Homogenisation Pressure (bar) | % Protein-% Sugar Concentration at heating | Heat Treatment of Protein-sugar solution | Free Fat (g/100 g powder) | Propanal (with IS) 4 wks-35° C. (μg/g powder) |
|---|---|---|---|---|---|
| Powders with 60% tuna oil, 13.3% protein, 13.3% glucose, 13.3% dried glucose syrup | | | | | |
| 6.5 | 350 | 10-2.5 | 90° C.-30 min | 3.89 | 50.9 |
| 7.0 | 350 | 10-2.5 | 90° C.-30 min | 5.03 | 20.3 |
| 7.5 | 350 | 10-2.5 | Reflux-30 min | 4.02 | 15.5 |
| 6.5 | 350/100 | 6-12 | Reflux-30 min | 5.10 | 17.0 |
| 7.5 | 350/100 | 6-12 | 90° C.-30 min | 1.66 | 9.3 |
| Powders with 60% tuna oil, 20% protein, 10% glucose, 10% dried glucose syrup | | | | | |
| 6.5 | 350/100 | 10-2.5 | 90° C.-30 min | 10.84 | 113.9 |
| 7.5 | 350/100 | 10-2.5 | Reflux-30 min | 7.93 | 26.5 |
| 6.5 | 350 | 9-9 | Reflux-30 min | 5.00 | 17.6 |
| 7.0 | 350/100 | 9-9 | Reflux-30 min | 9.54 | 6.8 |
| 7.5 | 350 | 9-9 | 90° C.-30 min | 5.77 | 10.5 |
| Powders with 60% tuna oil, 13.3% protein, 13.3% lactose, 13.3% sucrose | | | | | |
| 6.5 | 350/100 | 10-2.5 | Reflux-30 min | 3.26 | 37.7 |
| 7.5 | 350/100 | 10-2.5 | 90° C.-30 min | 4.00 | 24.5 |
| 6.5 | 350 | 6-12 | 90° C.-30 min | 5.33 | 121.4 |
| 7.0 | 350/100 | 6-12 | 90° C.-30 min | 4.77 | 25.7 |
| 7.5 | 350 | 6-12 | Reflux-30 min | 6.12 | 7.9 |
| Powders with 60% tuna oil, 20% protein, 10% lactose, 10% sucrose | | | | | |
| 6.5 | 350 | 10-2.5 | Reflux-30 min | 12.98 | 209.7 |
| 7.0 | 350 | 10-2.5 | Reflux-30 min | 7.16 | 64.7 |
| 7.5 | 350 | 10-2.5 | 90° C.-30 min | 7.42 | 41.4 |
| 6.5 | 350/100 | 9-9 | 90° C.-30 min | 10.78 | 169.2 |
| 7.5 | 350/100 | 9-9 | Reflux-30 min | 6.45 | 7.3 |
| Powders with 60% tuna oil, 13.3% protein, 3.3% glucose, 10% sucrose, 13.3% lactose | | | | | |
| 6.5 | 350 | 10-2.5 | Reflux-30 min | 6.57 | 39.5 |
| 7.0 | 350/100 | 10-2.5 | Reflux-30 min | 12.30 | 19.6 |
| 7.5 | 350 | 10-2.5 | 90° C.-30 min | 4.57 | 22.6 |
| 6.5 | 350/100 | 6-12 | 90° C.-30 min | 9.93 | 129.4 |
| 7.5 | 350/100 | 6-12 | Reflux-30 min | 2.87 | 5.7 |
| Powders with 60% tuna oil, 20% protein, 2.5% glucose, 7.5% sucrose, 10% lactose | | | | | |
| 6.5 | 350/100 | 10-2.5 | Reflux-30 min | 13.62 | 58.8 |
| 7.5 | 350/100 | 10-2.5 | 90° C.-30 min | 12.45 | 62.4 |
| 6.5 | 350 | 9-9 | 90° C.-30 min | 4.89 | 54.7 |
| 7.0 | 350 | 9-9 | 90° C.-30 min | 5.20 | 44.8 |
| 7.5 | 350 | 9-9 | Reflux-30 min | 5.00 | 33.3 |
| Powders with 60% tuna oil, 13.3% protein, 26.6% dried glucose syrup | | | | | |
| 6.5 | 350/100 | 10-2.5 | 90° C.-30 min | 17.63 | 110.2 |
| 7.5 | 350/100 | 10-2.5 | Reflux-30 min | 7.04 | 34.2 |
| 6.5 | 350 | 6-12 | Reflux-30 min | 10.53 | 28.6 |
| 7.0 | 350 | 6-12 | Reflux-30 min | 10.45 | 18.81 |
| 7.5 | 350 | 6-12 | 90° C.-30 min | 7.12 | 24.7 |
| Powders with 60% tuna oil, 20% protein, 20% dried glucose syrup | | | | | |
| 6.5 | 350 | 10-2.5 | 90° C.-30 min | 13.24 | 149.0 |
| 7.0 | 350/100 | 10-2.5 | 90° C.-30 min | 16.59 | 60.8 |
| 7.5 | 350 | 10-2.5 | Reflux-30 min | 16.92 | 41.7 |
| 6.5 | 350/100 | 9-9 | Reflux-30 min | 13.88 | 28.0 |
| 7.5 | 350/100 | 9-9 | 90° C.-30 min | 20.71 | 124.1 |

EXAMPLE 4

To Demonstrate the use of MRP Formed from Whey Protein Isolate (WPI)-sugar Mixtures as Encapsulants Powders containing tuna oil were prepared using Maillard Reaction Products produced from the reaction of WPI and sugars as encapsulants. The oils were emulsified into the protein-sugar mixtures that had been heated for at least 90° C. for 30 minutes or refluxed for 30 minutes. The emulsions were then homogenised or microfluidised and subsequently dried into powders. The free fat content of the powders was determined after powder production and these ranged from 4-8%. Samples of powder (80 g) were stored in 2 litre plastic containers to provide sufficient oxygen in the headspace to accelerate oxidation of the samples. These were stored at 35° C. for 4 weeks. Propanal, was determined using gas chromatography (GC) (static headspace analysis). MRP can be formed by reacting other proteins (other than casein) with sugars and used as encapsulants. Encapsulation efficiency and powder stability can be optimised by choosing the right combination of processing variables and formulation (Table 4).

EXAMPLE 5

To Demonstrate the use of MRP as Encapsulants for Blends of Tuna Oils with Higher Solid Fat Index Powders containing tuna oil and blends were prepared using Maillard Reaction Products produced from the reaction of WPI and sugars as encapsulants. The oils were emulsified into the protein-sugar mixtures that had been heated at 60° C. 90° C. or refluxed for 30 minutes. The emulsions were then homogenised and subsequently dried into powders. The free fat content of the powders was determined after powder production and these ranged from 3-5%. Samples of powder (80 g) were stored in 2 litre plastic containers to provide sufficient oxygen in the headspace to accelerate oxidation of the samples. These were stored at 35° C. for 4 weeks. Propanal, was determined using gas chromatography (GC) (static headspace analysis).

Powders containing tuna oil blends were more stable to oxidation when MRPs were used as encapsulants (Table 5)

TABLE 4

Characteristics of 45% fat powders prepared from heated WPI solutions showing the effect of order of processing, and type of sugars used on powder properties and stability

| Order of processing | % Protein-% Sugar Concentration at heating | Heat Treatment of Protein-sugar solution | Free Fat (g/100 g powder) | Propanal (with IS) 4 wks-35° C. (pg/g powder) |
|---|---|---|---|---|
| Powders with 45% tuna oil, 18.3% WPI, 18.3% glucose, 18.3% dried glucose syrup (homogenised) | | | | |
| Heat(with sugar)-oil-homog | 8-16 | 90° C.-30 min | 0.66 | 6.5 |
| Powders with 45% tuna oil, 18.3% WPI, 18.3% lactose, 18.3% sucrose (homogenised) | | | | |
| Heat(with sugar)-oil-homog | 8-16 | 90° C.-30 min | 0.46 | 11.1 |
| Powders with 45% tuna oil, 18.3% WPI, 18.3% glucose, 18.3% dried glucose syrup (microfluidised) | | | | |
| Heat(no sugar)-sugars-oil-homog | 9-0 | 90° C.-30 min | 0.49 | 12.0 |
| Heat(no sugar)-oil-sugars-homog | 9-0 | 90° C.-30 min | 0.30 | 8.3 |
| Heat(with sugar)-oil-homog | 8-16 | 90° C.-30 min | 0.38 | 3.9 |
| Powders with 45% tuna oil, 18.3% WPI, 18.3% lactose, 18.3% sucrose (microfluidised) | | | | |
| Heat(with sugar)-oil-homog | 8-16 | 90° C.-30 min | 0.36 | 12.0 |

TABLE 5

Characteristics of 60% fat powders prepared from heated casein-sugar formulations using tuna oil and a blend with higher solid fat index

| Type of oil | Heat Treatment of Protein-sugar solution | % Casein-% Sugar Concentration at heating | Free Fat (g/100 g powder) | Propanal (with IS) 4 wks-35° C. (µg/g powder) |
|---|---|---|---|---|
| Powders with 51% tuna oil, 9% hydrogenated palm oil, 13.3% protein, 13.3% glucose, 13.3% dried glucose syrup | | | | |
| Tuna oil + HPO | 60° C.-30 min | 6-12 | 2.14 | 7.4 |
| Tuna oil + HPO | 90° C.-30 min | 6-12 | 2.07 | 1.8 |
| Tuna oil + HPO | Reflux-30 min | 6-12 | 1.43 | 1.3 |

HPO "hydrogenated palm oil"

EXAMPLE 6

Demonstration of the Minimum Extent of the Maillard Reaction Products Required to Protect Tuna Oil in Powders and Emulsions Against Oxidation

6.1 Powders

Powders containing tuna oil were prepared using Maillard Reaction Products produced from the reaction of casein and sugars as encapsulants. The oils were emulsified into the protein-sugar mixtures that had been heated for at least 60° C. for 10 minutes up to 100° C. for 90 minutes. The emulsions were then homogenised and subsequently dried into powders. The free fat content of the powders was determined after powder production and these ranged from 0.6 to 1.5%. Samples of powder (80 g) were stored in 2 litre plastic containers to provide sufficient oxygen in the headspace to accelerate oxidation of the samples. These were stored at 35° C. for 4 weeks. Propanal was determined using gas chromatography (GC) (static headspace analysis).

The stability of tuna oil powders to oxidation, as indicated by the level of propanal in the headspace of stored powders, was dependent on the degree of heat treatment (time/temperature) applied to casein-sugar mixtures during the manufacture of these powders. The stability of tuna oil powders to oxidation was improved by higher heat treatment of the protein-sugar mixture. The extent of protection afforded to the finished powder increased with:

- Increasing extent of the Maillard Reaction as measured by the amount of reacted sugar
- Increasing the temperature of heat treatment applied to casein-sugar mixtures from 60° C. to 100° C.
- Increasing the time of heating applied to casein-sugar mixtures from 10 to 90 min at fixed temperature At least ~10% of the sugar in the protein-sugar mixtures has to be reacted to obtain desirable levels of protection of the oils (Table 6.1)

TABLE 6.1

Levels of Reacted Sugar and Characteristics of tuna oil powders prepared with differently heat-treated sugar-protein mixtures

| Casein:sugar ratio | Heat Treatment (° C.-min) | Sugar reacted (%) | Free fat (% powder) | Propanal @ 4 wks-35° C. (µg/g powder) with IS* |
|---|---|---|---|---|
| Protein:carbohydrate ratio = 1:2 | | | | |
| Casein-sugar mixtures used in Powders with 50% tuna oil, 16.7% Na-caseinate, 33.3% glucose | | | | |
| 1:2 | 60-30 | 0-1 | nd | nd |
| 1:2 | 60-60 | 0-1 | nd | nd |
| 1:2 | 60-90 | 0-2 | nd | nd |
| 1:2 | 80-30 | 2-3 | nd | nd |
| 1:2 | 80-60 | 3-4 | nd | nd |
| 1:2 | 80-90 | 4-6 | nd | nd |
| 1:2 | 100-30 | 9-10 | nd | nd |
| 1:2 | 100-60 | 12-14 | nd | nd |
| 1:2 | 100-90 | 17-20 | nd | nd |
| Protein:carbohydrate ratio = 1:2 | | | | |
| Powders with 50% tuna oil, 16.67% Na-caseinate, 16.67% glucose, 16.67% dried glucose syrup | | | | |
| 1:2 | 60-30 | nd | 1.01 | 47.6 |
| 1:2 | 60-60 | nd | 0.58 | 45.8 |
| 1:2 | 60-90 | nd | 0.66 | 44.7 |
| 1:2 | 80-30 | nd | 0.72 | 27.7 |
| 1:2 | 80-60 | nd | 1.59 | 20.4 |
| 1:2 | 80-90 | nd | 0.76 | 12.3 |
| 1:2 | 100-30 | nd | 0.75 | 3.1 |
| 1:2 | 100-60 | nd | 0.88 | 1.7 |
| 1:2 | 100-90 | nd | 1.54 | 0.9 |

| Casein:sugar ratio | Treatment (° C.-min) | Sugar reacted (%) | Free fat (% powder) | Propanal @ 2 wks-room (µg/g powder) with IS* |
|---|---|---|---|---|
| Protein:carbohydrate ratio = 1:1 | | | | |
| Powders with 50% tuna oil, 25% Na-caseinate, 25% glucose | | | | |
| 1:1 | no heat | 0-3 | Nd | 8.9 |
| 1:1 | 60-10 | 3-6 | Nd | 6.5 |
| 1:1 | 60-30 | 6-7 | Nd | 2.7 |
| 1:1 | 98-30 | 12-13 | Nd | 0.7 |
| Protein:carbohydrate ratio = 2:1 | | | | |
| Powders with 50% tuna oil, 33.3% Na-caseinate, 16.7% glucose | | | | |
| 2:1 | 60-30 | 2-6 | nd | 4.3 |
| 2:1 | 98-30 | 12-14 | nd | 1.1 |

*Samples were analysed using 3-Methylbutanal as an internal standard, and assuming response factors were similar in different matrices, nd, "not determined"

6.2 Emulsions

Emulsions containing tuna oil were prepared using Maillard Reaction Products produced from the reaction of casein and sugars as encapsulants. The oil was emulsified into the protein-sugar mixtures that had been heated for at least 60° C. for 10 minutes up to 100° C. for 90 minutes, using a homogeniser. Emulsions were stored for 4 weeks at 4° C. and analysed. Propanal were determined using GC (static headspace analysis).

The stability of tuna oil emulsions to oxidation, as indicated by the level of propanal in the headspace of stored emulsions, was dependent on the degree of heat treatment (time/temperature) applied to casein-sugar mixtures during the preparation of these emulsions. The stability of tuna oil emulsions to oxidation was improved by heat treatment of the protein-sugar mixture. The extent of protection afforded to the finished emulsions increased with:
Increasing extent of the Maillard Reaction as measured by the amount of reacted sugar
Increasing the temperature of heat treatment applied to casein-sugar mixtures from 60° C. to 100° C.
Increasing the time of heating applied to casein-sugar mixtures from 10 to 90 min at fixed temperature
At least ~10% of the sugar in the protein-sugar mixtures has to be reacted to obtain desirable levels of protection of the oils (Table 6.2)

TABLE 6.2

Levels of Reacted Sugar and propanal from tuna oil emulsions prepared with different degrees of reacting the sugar-protein mixtures

| Casein:sugar ratio | Heat Treatment (° C.-min) | Sugar reacted (%) | Propanal @ 20 wks-4° C. (μg/g emulsion) with IS* |
|---|---|---|---|
| Protein:carbohydrate ratio = 1:2 Casein-sugar mixtures used in Emulsions with 18% tuna oil, 6% Na-caseinate, 12% glucose | | | |
| 1:2 | 60-30 | 0-1 | nd |
| 1:2 | 60-60 | 0-1 | nd |
| 1:2 | 60-90 | 0-2 | nd |
| 1:2 | 80-30 | 2-3 | nd |
| 1:2 | 80-60 | 3-4 | nd |
| 1:2 | 80-90 | 4-6 | nd |
| 1:2 | 100-30 | 9-10 | nd |
| 1:2 | 100-60 | 12-14 | nd |
| 1:2 | 100-90 | 17-20 | nd |
| Protein:carbohydrate ratio = 1:2 Emulsions with 18% tuna oil, 6% Na-caseinate, 6% glucose, 6% dried glucose syrup | | | |
| 1:2 | 60-30 | nd | na |
| 1:2 | 60-60 | nd | 1.4 |
| 1:2 | 60-90 | nd | 1.4 |
| 1:2 | 80-30 | nd | 1.4 |
| 1:2 | 80-60 | nd | 1.1 |
| 1:2 | 80-90 | nd | 1.3 |
| 1:2 | 100-30 | nd | 0.3 |
| 1:2 | 100-60 | nd | 0.3 |
| 1:2 | 100-90 | nd | 0.4 |

*Samples were analysed using 3-Methylbutanal as internal standard, and assuming response factors were similar in different matrices.
nd, not determined

EXAMPLE 7

Demonstration of the use of Maillard Reaction Products as Encapsulants for Tuna Oil and Other oils 7.1 Powders
These examples demonstrate the use of MRP formed by reacting protein-sugar mixtures as encapsulants for tuna oil and other oils. The oils were emulsified into the protein-sugar mixtures that had been heated for 60° C.-30 minutes or at 98° C.-30 minutes. Homogenised emulsions containing tuna oil, evening primrose oil (EPO) or anhydrous milk fat (AMF) was subsequently dried into powders. The free fat in powder was determined after powder production and this ranged from 0.6 to 2.2%. Samples of powder (80 g) were stored in 2 litre plastic containers to provide sufficient oxygen in the headspace to accelerate oxidation of the samples, and stored at 35° C. for 4 weeks. Propanal was determined using GC (static headspace analysis).

Powders containing all oils tested (tuna oil, EPO or AMF) were more stable to oxidation when MRPs were used as encapsulants (Table 7.1)

TABLE 7.1

Characteristics of powders prepared containing 50% oil, 16.67% Na-caseinate, 16.67% glucose, 16.67% dried glucose syrup given different heat treatments

| Type of Oil | Heat Treatment (° C.-min) | Free fat (% powder) | Propanal @ 4 wks-35° C. (μg/g) ** | Propanal @ 13 wks-35° C. (μg/g powder) ** |
|---|---|---|---|---|
| Powders with 50% tuna oil, 16.67% Na-caseinate, 16.67% glucose, 16.67% dried glucose syrup | | | | |
| Tuna oil | 60-30 | 0.86 | 1.8 | nd |
| Tuna oil | 98-30 | 0.62 | 0.7 | nd |

| Type of Oil | Heat Treatment (° C.-min) | Free fat (% powder) | Hexanal @ 13 wks-35° C. (μg/g) ** | Propanal @ 13 wks-35° C. (μg/g powder) ** |
|---|---|---|---|---|
| Powders with 50% evening primrose oil (EPO), 16.67% Na-caseinate, 16.67% glucose, 16.67% dried glucose syrup | | | | |
| EPO | 60-30 | 2.15 | 49.5 | 5.2 |
| EPO | 98-30 | 1.13 | 13.2 | 2.6 |
| Powders with 50% anhydrous milk fat (AMF), 16.67% Na-caseinate, 16.67% glucose, 16.67% dried glucose syrup | | | | |
| AMF | 60-30 | 0.64 | <0.1 | 0.4 |
| AMF | 98-30 | 0.62 | <0.1 | <0.1 |

** Samples were analysed without the use of an internal standard
nd, not determined
Note:
Tuna oil powders were analysed after 4 weeks storage, whereas powders with EPO or AMF were analysed after 13 weeks storage as there was very low level of oxidation in the samples after 4 weeks of storage 7.2 Emulsions
Emulsions containing tuna oil, evening primrose oil (EPO) and anhydrous milk fat (AMF) were prepared using Maillard Reaction Products produced from the reaction of casein and sugars as encapsulants. The oil were emulsified into the protein-sugar mixtures after heating for 98° C. for 30 minutes, and homogenised. Emulsions were stored for 4 weeks at 4° C. and analysed. Propanal were determined using GC (static headspace analysis).

TABLE 7.2

Characteristics of emulsions prepared containing different types of oil

| Type of Oil | Heat Treatment (° C.-min) | Propanal @ 4 wks-4° C. (μg/g emulsion) ** |
|---|---|---|
| Emulsions with 18% tuna oil, 6% Na-caseinate, 6% glucose, 6% dried glucose syrup | | |
| Tuna oil | 98-30 | <0.1 |

| Type of Oil | Heat Treatment (° C.-min) | Hexanal @ 4 wks-4° C. (μg/g emulsion) ** |
|---|---|---|

TABLE 7.2-continued

Characteristics of emulsions prepared containing different types of oil

Emulsions with 18% evening primrose oil (EPO),
6% Na-caseinate, 6% glucose, 6% dried glucose syrup

| EPO | 98-30 | 0.3 |
|---|---|---|

| Type of Oil | Heat Treatment (° C.-min) | Propanal @ 4 wks-4° C. (μg/g emulsion) ** |
|---|---|---|
| Emulsions with 18% anhydrous milk fat (AMF), 6% Na-caseinate, 6% glucose, 6% dried glucose syrup ||| 
| AMF | 98-30 | <0.1 |

** Samples were analysed without internal standard
nd, not determined

EXAMPLE 8

Extension of the use of Maillard Reaction Products as Encapsulants for the Protection of Lipid Soluble Vitamins

8.1 Powders

The following example illustrates the use of Maillard Reaction Products as encapsulants for lipid soluble vitamins. The protein has been reacted with sugars at 60° C. for 30 minutes or at 98° C. for 30 minutes to form the MRP, prior to forming the emulsions. Mixed carotenoids in medium chain triglyceride (MCT) were emulsified into the casein-sugar reacted solution and subsequently dried into powders. The free fat in powder was determined after powder production and this ranged from 2.0-2.5%. Carotene contents in powders were measured using UV-visible spectroscopy.

TABLE 8.1

Carotene contents in powders

| Type of Oil | Treatment (° C.-min) | Free fat (% powder) | Mixed carotenoids after production (mg/10 g powder) |
|---|---|---|---|
| Powders with 15% mixed carotenoids and 35% medium chain triglyceride oil (MCT), 16.67% Na-caseinate, 16.67% glucose, 16.67% dried glucose syrup ||||
| MCT + mixed carotenoids | 60-30 | 2.1 | 1500 |
| MCT + mixed carotenoids | 98-30 | 2.5 | 1500 |

8.2 Emulsions

The following example illustrates the use of Maillard Reaction Products as encapsulants for lipid soluble vitamins in emulsion systems. Emulsions containing mixed carotenoids were prepared using Maillard Reaction Products produced from the reaction of casein and sugars as encapsulants. Mixed carotenoids were emulsified into the protein-sugar mixtures after heating for 60° C. for 30 minutes or at 98° C. for 30 minutes, and homogenised. Carotene contents in the emulsions were determined by UV-visible spectroscopy.

TABLE 8.2

Carotene contents in prepared emulsions

| Type of Oil | Treatment (° C.-min) | Mixed carotenoids after production (mg/10 g emulsion) |
|---|---|---|
| Emulsions with 5.4% mixed carotenoids and 12.6% medium chain triglyceride oil (MCT), 6% Na-caseinate, 6% glucose, 6% dried glucose syrup |||
| MCT + mixed carotenoids | 60-30 | 540 |
| MCT + mixed carotenoids | 98-30 | 540 |

EXAMPLE 9

Extension of the use of Maillard Reaction Products as encapsulants for the protection of long chain polyunsaturated (LCP) oils with added Iron salt (Ferrous Sulfate)

9.1 Powders

The following examples illustrate the use of Maillard Reaction products as encapsulants for the protection of long chain polyunsaturated (LCP) oils with added Iron salt (Ferrous Sulfate). The protein has been reacted with sugars at 60° C. for 30 minutes or at 98° C. for 30 minutes to form the MRP, prior to forming the emulsions and subsequently drying. Powders containing 50% tuna oil was dry blended with ferrous sulphate. Samples of powder (80 g) containing the Iron salt were stored in 2 litre plastic containers to provide sufficient oxygen in the headspace to accelerate oxidation of the samples, and stored at 35° C. for 4 weeks. Propanal was determined using GC (static headspace analysis).

With use of MRPs as encapsulants (formed at 98° C. for 30min), there was more protection of the oils in dry blends of tuna oil powders and iron salt compared to corresponding samples with less severe heat treatment (Table 9.1)

TABLE 9.1

Characteristics of tuna oil powders with Iron Salt (Ferrous Sulfate) added after powder production.

| Type of Oil | Heat Treatment (° C.-min) | Iron Content# (mg/10 g powder blend) | Propanal @ 4 wks-35° C. (μg/g powder) ** |
|---|---|---|---|
| Powders with 50% tuna oil blended with Ferrous Sulfate, 16.67% Na-caseinate (Ncas), 16.67% glucose, 16.67% dried glucose syrup ||||
| Tuna oil | 60-30 | 14 | 1.8 |
| Tuna oil | 98-30 | 14 | 0.7 |
| Powders with 50% tuna oil, 16.67% whey protein isolate (WPI), 16.67% glucose, 16.67% dried glucose syrup ||||
| Tuna oil | 60-30 | 14 | 1.3 |
| Tuna oil | 98-30 | 14 | 0.8 |

Dry blended after powder production
** Samples were analysed without internal standard

9.2 Emulsions

Emulsions containing tuna oil were prepared using Maillard Reaction Products produced from the reaction of casein and sugars as encapsulants. The oil were emulsified into the protein-sugar mixtures after heating for 60° C. for 30 minutes or at 98° C. for 30 minutes, and homogenised. Iron was added and dissolved into the emulsion after homogenisation. Emulsions were stored for 4 weeks at 4° C. and analysed. Propanal were determined using GC (static headspace analysis).

The higher level of secondary oxidation products, as indicated by the anisidine value, in the sample that had been heated at 60° C. for 30 min compared to that heated at 98° C. for 30 min demonstrated that MRPs afforded protection of the oils. As the peroxides are primary products of oxidation, the low value in samples heated at 60° C. for 30 min coupled with the higher anisidine value suggests that some of the peroxides had broken down to other products.

With use of MRPs as encapsulants (formed at 98° C. for 30min), there was more protection of the oil in Fe-fortified emulsions compared to corresponding samples with less severe heat treatment (Table 9.2)

TABLE 9.2

Characteristics of Tuna oil extracted from emulsions containing Iron Salt (Ferrous Sulfate) after 1 week storage at room temperature with light. Emulsions with 18% tuna oil, 6% na-caseinate, 6% glucose, 6% dried glucose syrup, and Ferrous Sulfate

| Type of Oil | Treatment (° C.-min) | Iron Content# (mg/10 g emulsion) | DHA content % Area | Peroxide Value (meq/ 1000 g) | p-Anisidine value |
|---|---|---|---|---|---|
| Tuna oil | 60-30 | 25 | 26.62 | 1.0 | 17.2 |
| Tuna oil | 98-30 | 25 | 26.78 | 11.2 | 12.5 |

Iron was added to the emulsion after emulsification.
DHA "docosahexanoic acid"

EXAMPLE 10

Extension of the use of Maillard Reaction Products as Encapsulants for the Protection of Long Chain Polyunsaturated (LCP) Oils in Combination with Selected Nutraceuticals 10.1 Powders The following examples illustrate the use of Maillard Reaction products as encapsulants for the protection of long chain polyunsaturated (LCP) oils in combination with selected nutraceuticals. The protein has been reacted with sugars at 60° C. for 30 minutes or at 98° C. for 30 minutes to form the MRP, prior to forming the emulsions and subsequently drying. Powders containing 50% tuna oil was dry blended with selected nutraceuticals. Samples of tuna oil powder (80 g) containing either calcium, folate or isoflavone were stored in 2 litre plastic containers to provide sufficient oxygen in the headspace to accelerate oxidation of the samples, and stored at 35° C. for 4 weeks. Propanal was determined using GC (static headspace analysis).

With use of MRPs as encapsulants (formed at 98° C. for 30min), there was generally more protection of the oils in dry blends of tuna oil powders and other nutraceuticals compared to corresponding samples with less severe heat treatment (Table 10.1)

TABLE 10.1

Characteristics of tuna oil powders with other nutraceuticals (Calcium, Folate, Isoflavone) added after powder production.

Powders with 50% tuna oil, 16.67% Na-caseinate (Ncas), 16.67% glucose, 16.67% dried glucose syrup and nutraceuticals

| Type of Oil | Treatment (° C.-min) | Calcium# (mg/10 g powder) | Propanal @ 4 wks-35° C. (μg/g powder) ** |
|---|---|---|---|
| Tuna oil | 60-30 | 260 | 2.0 |
| Tuna oil | 98-30 | 260 | 0.5 |

| Type of Oil | Treatment (° C.-min) | Folate# (mg/10 g powder) | Propanal @ 4 wks-35° C. (μg/g powder) ** |
|---|---|---|---|
| Tuna oil | 60-30 | 200 | 1.7 |
| Tuna oil | 98-30 | 200 | 0.6 |

| Type of Oil | Treatment (° C.-min) | Isoflavone# (mg/10 g powder) | Propanal @ 4 wks-35° C. (μg/g powder) ** |
|---|---|---|---|
| Tuna oil | 60-30 | 30 | 2.3 |
| Tuna oil | 98-30 | 30 | 0.7 |

Powders with 50% tuna oil, 16.67% whey protein isolate (WPI), 16.67% glucose, 16.67% dried glucose syrup

| Type of Oil | Treatment (° C.-min) | Calcium# (mg/10 g powder) | Propanal @ 4 wks-35° C. (μg/g powder) ** |
|---|---|---|---|
| Tuna oil | 60-30 | 260 | 1.2 |
| Tuna oil | 98-30 | 260 | 0.6 |

| Type of Oil | Treatment (° C.-min) | Folate# (mg/10 g powder) | Propanal @ 4 wks-35° C. (μg/g powder) ** |
|---|---|---|---|
| Tuna oil | 60-30 | 200 | 1.0 |
| Tuna oil | 98-30 | 200 | 0.7 |

Dry blended after powder production
** Samples were analysed without internal standard

EXAMPLE 11

Demonstration of the Effectiveness of Oligosaccharides in Developing Maillard Reaction Products for Encapsulation of Oils 11.1 Powders The following examples illustrate the effectives of oligosaccharides for the preparation of MRP's intended as encapsulants for tuna oil and other lipids. Raftilose P95 (Mandurah Australia Pty Ltd) an oligosaccharide from chicory inulin was used in this example. The protein has been reacted with sugars (glucose or oligosaccharide) at 60° C. for 30 minutes or at 98° C. for 30 minutes to form the MRP, prior to forming the emulsions and subsequently drying. The free fat in powders was determined after powder production ranging from 0.6 to 3.6%. Samples of powder (80 g) was stored in 2 litre plastic containers to provide sufficient oxygen in the headspace to accelerate oxidation of the samples, and stored at 35° C. for 4 weeks. Propanal was determined using GC (static headspace analysis) With use of MRPs as encapsulants (formed at 98° C. for 30min), there was more protection of the oil compared to corresponding samples with less severe heat treatment (Table 11. 1)

TABLE 11.1

Characteristics of powders with MRP's formed by using other type of sugar

| Type of Oil | Treatment (° C.-min) | Free fat (% powder) | Propanal @ 4 wks-35° C. (μg/g powder) ** |
|---|---|---|---|
| Powders with 50% tuna oil, 16.67% na-caseinate, 16.67% glucose, 16.67% dried glucose syrup | | | |
| Tuna oil | 60-30 | 0.86 | 1.8 |
| Tuna oil | 98-30 | 0.62 | 0.7 |
| Powders with 50% tuna oil, 16.67% na-caseinate, 16.67% oligosaccharide, 16.67% dried glucose syrup | | | |
| Tuna oil | 60-30 | 3.55 | 1.6 |
| Tuna oil | 98-30 | 2.54 | 0.7 |

** Samples were analysed without internal standard

11.2 Emulsions

Emulsions containing tuna oil were prepared using Maillard Reaction Products produced from the reaction of casein and sugars as encapsulants. The oil were emulsified into the protein-sugar mixtures after heating for 98° C. for 30 minutes, and homogenised. Emulsions were stored for 4 weeks at 4° C. and analysed. Propanal were determined using GC (static headspace analysis).

TABLE 11.2

Characteristics of emulsions prepared with MRP formed by using other type of sugar

| Type of Oil | Treatment (° C.-min) | Propanal @ 4 wks-4° C. (μg/g emulsion) ** |
|---|---|---|
| Emulsions with 18% tuna oil, 6% Na-caseinate, 6% glucose, 6% dried glucose syrup | | |
| Tuna oil | 98-30 | <0.1 |
| Emulsions with 18% tuna oil, 6% Na-caseinate, 6% oligosaccharide, 6% dried glucose syrup | | |
| Tuna oil | 98-30 | <0.1 |

** Samples were analysed without internal standard

EXAMPLE 12

Demonstration of the Effects of Different Stages of Formation of Maillard Reaction Products during Manufacture of Powders and Emulsions on Protection of Oils

12.1 Powders

The following examples illustrate the effectives of MRP's formed either before or after emulsification. The protein has been reacted with glucose and dried glucose syrup at 98° C. for 30 minutes to form the MRP, either before or after emulsification, and subsequently drying into powders. The free fat in powder was determined after powder production and this ranged from 0.7 to 2.3%. Powder samples (80 g) was stored in 2 litre plastic containers to provide sufficient oxygen in the headspace to accelerate oxidation of the samples, and stored at 35° C. for 4 weeks. Propanal was determined using GC (static headspace analysis).

MRP formed at 98° C. for 30min either before or after emulsification offers more protection to the oil compared to corresponding samples with less severe heat treatment. (Table 12.1)

TABLE 12.1

Characteristics of powders prepared with MRP reacted before or after emulsification. Powders with 50% tuna oil, 16.67% na-caseinate, 16.67% glucose, 16.67% dried glucose syrup

| Order of Processing* | Heat Treatment (° C.-min) | Free fat (% powder) | Propanal @ 4 wks-35° C. (μg/g powder)** |
|---|---|---|---|
| heat-oil-homog[1] | 60-30 | 0.65 | 1.7 |
| heat-oil-homog[1] | 98-30 | 1.34 | 0.8 |
| Oil-homog-heat[2] | 98-30 | 2.34 | 0.4 |

**Samples were analysed without internal standard
Notes on the different stage of MRP formation:
[1]heat-oil-homog "protein-sugar mixture was heated, oil was emulsified, and homogenised"
[2]oil-homog-heat "oil was emulsified into the protein-sugar mixture, homogenised, and heated"

12.2 Emulsions

Emulsions containing tuna oil were prepared using Maillard Reaction Products produced from the reaction of casein and sugars as encapsulants. The stage of reaction (MRP formation) was either before emulsification (without oil) or after emulsification (in the presence of oil). The MRP were formed by heating the mixtures at 98° C. for 30 minutes, and homogenised. Emulsions were stored for 4 weeks at 4° C. and analysed. Propanal were determined using GC (static headspace analysis).

TABLE 12.2

Characteristic of emulsions prepared with MRP's reacted before or after emulsification. Emulsions with 18% tuna oil, 6% Na-caseinate, 6% glucose, 6% dried glucose syrup

| Order of Processing | Treatment (° C.-min) | Propanal @ 4 wks-4° C. (μg/g emulsion)** |
|---|---|---|
| heat-oil-homog[1] | 98-30 | <0.1 |
| Oil-homog-heat[2] | 98-30 | <0.1 |

**Samples were analysed without internal standard
Notes on the different stage of MRP formation:
[1]heat-oil-homog "MRP formed before emulsification"
[2]oil-homog-heat "MRP formed after emulsification."

EXAMPLE 3

Effectiveness of Various Proteins for Preparation of Maillard Reaction Products Intended as Encapsulants of Oils

13.1 Powders

The following examples illustrate the effectives of other proteins for the preparation of MRP's intended as encapsulants for tuna oil and other lipids. The different proteins used were sodium caseinate (Na-Cas), whey protein isolate (WPI), soy protein isolate (SPI) and skim milk powder (SMP). These proteins have been reacted with sugars at 60° C. for 30 minutes or at 98° C. for 30 minutes to form the MRP, prior to forming the emulsions and subsequently drying. The free fat in powders was determined after powder production ranging from 0.6 to 2.7%. Samples of powder (80 g) was stored in 2 litre plastic containers to provide sufficient oxygen in the headspace to accelerate oxidation of the samples, and stored at 35° C. for 4 weeks. Propanal was determined using GC (static headspace analysis)

With all the proteins used to form MRP as encapsulants (formed at 98° C. for 30 min), there was more protection of the oil compared to corresponding samples with less severe heat treatment. (Table 13.1)

TABLE 13.1

Characteristics of powders prepared using different proteins to form MRP's

| Type of Protein | Treatment (° C.-min) | Free Fat (% powder) | Propanal @ 4 wks-35° C. (μg/g powder)** |
|---|---|---|---|
| Powders with 50% tuna oil, 16.67% na-caseinate, 16.67% glucose, 16.67% dried glucose syrup | | | |
| Na-Cas | 60-30 | 0.86 | 1.8 |
| Na-Cas | 98-30 | 0.62 | 0.7 |
| Powders with 50% tuna oil, 16.67% WPI, 16.67% glucose, 16.67% dried glucose syrup | | | |
| WPI | 60-30 | 0.78 | 1.3 |
| WPI | 98-30 | 0.72 | 0.8 |
| Powders with 50% tuna oil, 17.6% SPI, 16.7% glucose, 15.7% dried glucose syrup | | | |
| SPI | 60-30 | 0.67 | 2.9 |
| SPI | 98-30 | 0.63 | 2.1 |
| Powders with 50% tuna oil, 42% SMP (17.6% protein, 24.3% lactose,), 8% glucose | | | |
| SMP | 60-30 | 1.98 | 2.5 |
| SMP | 98-30 | 2.72 | 0.3 |

**Samples were analysed without internal standard 13.2 Emulsions

The following examples illustrate the effectives of other proteins for the preparation of MRP's intended as encapsulants for tuna oil and other lipids. The different proteins used were sodium caseinate (Na-Cas), whey protein isolate (WPI), soy protein isolate (SPI) skim milk powder (SMP), hydrolysed casein protein (HCP) and hydrolysed whey protein (HWP). These proteins were reacted with sugars at 98° C. for 30 minutes to form the MRP, prior to forming the emulsions. Emulsions were stored at 4° C. for 4 weeks, and Propanal was determined using GC (static headspace analysis).

TABLE 13.2

Characteristics of emulsions prepared using different proteins to form MRP's

| Type of Protein | Treatment (° C.-min) | Propanal @ 4 wks-4° C. (μg/g emulsion)** |
|---|---|---|
| Emulsions with 18% tuna oil, 6% Na-cas, 6% glucose, 6% dried glucose syrup | | |
| Na-Cas | 98-30 | <0.1 |
| Emulsions with 18% tuna oil, 6% WPIs, 6% glucose, 6% dried glucose syrup | | |
| WPI | 98-30 | <0.1 |
| Emulsions with 18% tuna oil, 6.3% SPI, 6% glucose, 5.7% dried glucose syrup | | |
| SPI | 98-30 | <0.1 |
| Emulsions with 18% tuna oil, 15% SMP (6.3 protein, 8.7% lactose), 3% glucose | | |
| SMP | 98-30 | <0.1 |
| Emulsions with 18% tuna oil, 6% HCP, 6% glucose, 6% dried glucose syrup | | |
| HCP | 98-30 | <0.1 |
| Emulsions with 18% tuna oil, 7% HWP (0.4% lactose), 6% glucose, 5% dried glucose syrup | | |
| HWP | 98-30 | <0.1 |

**Samples were analysed without internal standard

EXAMPLE 14

Application of a Secondary Coating Material to Powders

Application of secondary coating may enhance the shelf life of the powders by providing additional barrier to its surroundings or can be used, as an alternative way to deliver desired ingredients. It can also change the release properties of the encapsulated material by providing controlled release or delayed release, allowing for specific target time or target place of release. Secondary coating materials which could be used to achieve the above desired outcomes may include a fat/oil, fat mixtures, a fat and a non-fat mixture, polysaccharides, gels, hydrocolloids, shellac, acid crystals, proteins, gums etc. The processing techniques employed to apply a secondary coating may include fluid bed processing (top spray or wurster application), pan coating, spray gelation and by spraying the material during blending (ribbon blender)

In this example powder containing 50% oil prepared using MRP from the reaction of protein and sugars was sieved through a 600 μm sieve and divided into 500 g lots. Medium chain triglyceride (MCT) oil was used as the secondary coating material, which was applied using a fluid bed dryer-granulator (NIRO STREA-1). The spray nozzle was positioned above the bed for top spray coating.

The process conditions used in this example are as follows:

| | |
|---|---|
| Air volume | 80 m$^3$ hr$^{-1}$ |
| Product/Screen Pressure Drop | 90 mmH$_2$O |
| Nozzle Air Pressure | 80 kPa |
| Product Temperature | 25° C. |
| Outlet Temperature | 18° C. |

The following table demonstrates the possibility of secondary coating applications to enhance the encapsulated powder properties. Increase in powder free fat with each addition of the medium chain triglyceride coat show that the fat coating spray applied was deposited on the powder surfaces.

TABLE 14

Free fat analysis of powders with secondary coating

| MCT coat addition (% w/w) | Powder Free Fat (g/100 g) |
|---|---|
| 0 | 8.9 |
| 1 | 9.8 |
| 2 | 11.0 |
| 4 | 12.1 |

CONCLUSION

The formulation and preparation of oil-in-water emulsions, is the most important step in the successful production of microencapsulated fats and oil in emulsions or powders.

Very low powder free fat in tuna oil powders even at high oil loading has been achieved with the use of mixed protein-carbohydrate encapsulants. The mixed systems (protein-carbohydrate) investigated using Na-caseinate or whey protein isolate (WPI) in combination with sugars (glucose, sucrose, lactose, dried glucose syrup and oligosaccharide), and in some cases with polysaccharide (carrageenan or High-methoxy pectin) gave good powders. Powders formulated with heated NaCas-sugar mixtures were generally more resistant to oxidation compared to those made from unheated mixtures.

Other general conclusions are:

Dry free flowing powder with oil loading up to 80% may be successfully produced with the appropriate choice of encapsulants.

Increased level of sugars lowers the powder free fat, but also reduces powder recovery during drying. Thus the level of sugars has to be carefully chosen to ensure adequate powder recovery during production whilst achieving low powder free fat.

Generally a lower total solids at the time of homogenisation lowers the powder free fat.

In mixed protein and carbohydrate systems a protein:carbohydrate ratio of 1:2 is better than a ratio of 1:1, which was demonstrated by lower powder free fat and better protection of the oil from oxidation.

Heating all the caseinate and sugars of the aqueous phase by refluxing or heating at 90° C. for 30 minutes afforded better protection to powders against oxidation, than heating only part of the caseinate and part of the sugar used in the system.

In heated casein-sugar systems refluxing the mixture for 30 minutes afforded better protection to powders against oxidation, than heating at 90° C. for 30 minutes.

The pH of the of the casein-sugar mixture at the time of heating has significant effects on both the powder free fat and the resistance of the powder to oxidation during storage; with heating at the higher pH of 7.5 being better than heating at pH 7 or at pH 6.5

The type of sugar used in combination with the protein has also some effect on the degree of protection from oxidation it can offer during powder storage.

At least about 10% of the sugar in the sugar protein mixtures should be reacted to obtain desirable levels of anti-oxidant protection

The invention claimed is:

1. A method of forming a powder containing a polyunsaturated oil comprising:
    a) preparing an aqueous mixture of a water soluble film forming protein and a carbohydrate which contains a reducing sugar group;
    b) heating the mixture from 60° C. to 160° C. for a period to allow sufficient Maillard reaction products to form without coagulation consuming at least 10% of the sugar to provide resistance to oxidation;
    c) dispersing said oil in the aqueous phase;
    d) homogenising the mixture to obtain an emulsion; and
    e) drying the emulsion to form a powder,
    wherein the polyunsaturated oil is selected from the group consisting of canola oil, borage oil, evening primrose oil, safflower oil, sunflower oil, flaxseed oil, wheat germ oil, grape seed oil, marine oils obtained from fish, vitamin A, vitamin D, vitamin E, tocopherols, tocotrienols, vitamin K, and beta-carotene.

2. A method of forming a powder containing a polyunsaturated oil as claimed in claim 1, wherein at least some of the carbohydrate is added after the emulsion is formed and step b) is carried out after step d) but before step e).

3. A method of forming a powder containing a polyunsaturated oil as claimed in claim 1, wherein the total solids at homogenisation is less than 50% and the protein:carbohydrate weight ratio is between 1:4 and 4:1.

4. A method of forming a powder as claimed in claim 1, wherein the water soluble protein is selected from milk proteins and soy proteins.

5. A method of forming a powder as claimed in claim 4, wherein the milk protein is selected from whey proteins and casein.

6. A method of protecting a polyunsaturated oil from degradation comprising:
    a) preparing an aqueous mixture of a water soluble film forming protein and a carbohydrate which contains a reducing sugar group;
    b) heating the mixture from 60° C. to 160° C. for a period to allow sufficient Maillard reaction products to form without coagulation consuming at least 10% of the sugar to provide resistance to oxidation;
    c) dispersing said oil in the aqueous phase; and
    d) homogenising the mixture to obtain an emulsion,
    wherein the polyunsaturated oil is selected from the group consisting of canola oil, borage oil, evening primrose oil, safflower oil, sunflower oil, flaxseed oil, wheat germ oil, grape seed oil, marine oils obtained from fish, vitamin A, vitamin D, vitamin E, tocopherols, tocotrienols, vitamin K, and beta-carotene.

7. The method of claim 6, further comprising drying the emulsion to form a powder.

* * * * *